(12) United States Patent
Sakamoto (10) Patent No.: US 7,944,496 B2
(45) Date of Patent: May 17, 2011

(54) IMAGING APPARATUS AND DRIVING METHOD FOR CCD TYPE SOLID-STATE IMAGING DEVICE

(75) Inventor: Tomohiro Sakamoto, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 349 days.

(21) Appl. No.: 12/200,537

(22) Filed: Aug. 28, 2008

(65) Prior Publication Data

US 2009/0059051 A1 Mar. 5, 2009

(30) Foreign Application Priority Data

Aug. 31, 2007 (JP) ................ P2007-225333

(51) Int. Cl.
*H04N 5/335* (2011.01)

(52) U.S. Cl. ...................................... 348/315; 348/311

(58) Field of Classification Search .................. 348/311, 348/302, 315, 296–298
See application file for complete search history.

(56) References Cited

U.S. PATENT DOCUMENTS

| | | | |
|---|---|---|---|
| 6,236,434 B1 | 5/2001 | Yamada | |
| 6,831,692 B1 * | 12/2004 | Oda | ................ 348/315 |
| 6,914,633 B1 * | 7/2005 | Yamada | ................ 348/315 |
| 2004/0017497 A1 | 1/2004 | Suzuki et al. | |

FOREIGN PATENT DOCUMENTS

| | | |
|---|---|---|
| JP | 9-252107 A | 9/1997 |
| JP | 10-136391 A | 5/1998 |
| JP | 2004-55786 A | 2/2004 |
| JP | 2007-124137 A | 5/2007 |

* cited by examiner

*Primary Examiner* — Tuan Ho
(74) *Attorney, Agent, or Firm* — Birch, Stewart, Kolasch & Birch, LLP (57) ABSTRACT

A driving method for driving a CCD type solid-state imaging device, includes: controlling, when taking dynamic images without a mechanical shutter, exposure time of a first pixel group and exposure time of a second pixel group separately by an electronic shutter function and by timings of reading pulses applied to transfer electrodes which concurrently functions as reading electrodes and which are included in vertical charge transfer paths; causing the vertical charge transfer paths to hold, until the reading pulses are applied to the second pixel group, signal charges read from the respective pixels of the first pixel group to which the reading pulses are applied beforehand of the first pixel group and the second pixel group; and transferring the signal charges read from the first pixel group and signal charges read from the second pixel group together on the vertical charge transfer paths.

4 Claims, 13 Drawing Sheets

TIME t1
(DURING EXPOSURE)

FIG. 5B

TIME t2
(READING OF FIRST GROUP PIXELS)

IMAGING APPARATUS AND DRIVING METHOD FOR CCD TYPE SOLID-STATE IMAGING DEVICE

CROSS-REFERENCE TO RELATED APPLICATIONS

This application is based on and claims priority under 35 USC 119 from Japanese Patent Application No. 2007-225333 filed Aug. 31, 2007; the entire of which are incorporated herein by reference.

BACKGROUND

1. Technical Field

The present invention relates to a driving method for a CCD type solid-state imaging device and an imaging apparatus, and in particular, to a driving method for a CCD type solid-state imaging device and an imaging apparatus, which are capable of reading dynamic image data in a wide dynamic range from imaging devices.

2. Related Art

Patent Document 1 (JP 2004-55786 A corresponding to US 2004/017497 A) discloses a CCD type solid-state imaging device in which approximately half of the pixels provided in the form of a two-dimensional array on a semiconductor substrate are made into high sensitivity pixels having a large area, and approximately the remaining half are made into low sensitivity pixels having a small area. Using the CCD type solid-state imaging device, taken image data read by the high sensitivity pixels are synthesized with taken image data read from the low sensitivity pixels, whereby it is possible to attempt to secure a wide dynamic range of taken images.

Also, Patent Document 2 (JP Hei. 9-252107 A) discloses a CCD type solid-state imaging device, in which two types of photoelectric converters are provided, capable of varying the respective charge accumulation times thereof. Even in the CCD type solid-state imaging device, it is possible to cause taken images to be brought into a wide dynamic range by synthesizing output signals of two types of photoelectric converters.

In Patent Document 3 (JP 2007-124137 A), two types of pixels that vary charge accumulation times by a CMOS type solid-state imaging device are mixedly provided on a semiconductor substrate, and it is possible to cause taken images to be brought into a wide dynamic range by synthesizing taken image data read from each device.

Where high sensitivity pixels of a large area and low sensitivity pixels of a small area are mixedly provided on a imaging device, the range magnification of the dynamic range will be predetermined by the area ratio, etc. There is a problem that any optional range magnification is not obtainable.

Further, in the case of a CMOS type, although it is easy to vary the charge accumulation time of pixels, there is a problem that, in the case of a CCD type, it is not easy to optionally vary the charge accumulation times for pixels for taking high sensitivity images and for pixels for taking low sensitivity images, which are mixedly provided on a semiconductor substrate, where a dynamic image is picked up without using a mechanical shutter, that is, where carrying out progressive (non-interlace) reading but not an interlace reading (multi-field reading).

Therefore, it is an object of the present invention to provide a method for driving a CCD type solid-state imaging device and an imaging apparatus, which are capable of obtaining dynamic image data in a wide dynamic range.

SUMMARY

[1] According to an aspect of the invention, a driving method for driving a charge-coupled device type solid-state imaging device including: a first pixel group that has a plurality of pixels arrayed and formed in a two-dimensional array on a surface portion of a semiconductor substrate; a second pixel group that (i) has a plurality of pixels arrayed and formed in a two-dimensional array on the surface portion of the semiconductor substrate in an area that overlaps the first pixel group and (ii) has the plurality of pixels at slipped positions with respect to the respective pixels of the first pixel group; a plurality of vertical charge transfer paths that extend along pixel columns and are provided for the respective pixel columns, the pixel columns which (i) have the plurality of pixels of the first pixel group and the plurality of pixels of the second pixel group and (ii) extend in a vertical direction; a horizontal charge transfer path formed along end parts in the transfer direction of the plurality of the vertical charge transfer paths; and an output amplifier that (i) is provided at the output end portion of the horizontal charge transfer path and (ii) outputs, as taken image data, voltage value signals responsive to the amount of electric charge of transferred signals, the driving method includes: controlling, when taking dynamic images without a mechanical shutter, exposure time of the first pixel group and exposure time of the second pixel group separately by an electronic shutter function and by timings of reading pulses applied to transfer electrodes which concurrently functions as reading electrodes and which are included in the vertical charge transfer paths; causing the vertical charge transfer paths to hold, until the reading pulses are applied to the second pixel group, the signal charges read from the respective pixels of the first pixel group to which the reading pulses are applied beforehand of the first pixel group and the second pixel group; transferring the signal charges read from the first pixel group and the signal charges read from the second pixel group together on the vertical charge transfer paths; and outputting the signal charges read from the first pixel group and the signal charges read from the second pixel group together from the output amplifier.

[2] According to the driving method of [1], the pixels of the first pixel group may be arranged in a square lattice. The pixels of the second pixel group may be arranged in a square lattice. The pixels of the second pixel group may be disposed with one-half pixel pitch slipped in both the horizontal and the vertical directions with respect to the pixels of the first pixel group. The vertical charge transfer paths may be formed to meander with avoiding the pixels in the vertical direction. Color filters laminated on respective pixels of the first pixel group may be in Bayer arrangement, and color filters laminated on respective pixels of the second pixel group may be in Bayer arrangement.

[3] According to the driving method of [2], the driving method may further include: transferring the signal charges read from the respective pixels of the first pixel group in the vertical direction to positions adjacent to the horizontal direction of the pixels of the second pixel group; and causing the vertical charge transfer paths to hold the signal charges transferred at the positions until the signal charges are read from the second pixel group.

[4] According to the driving method of [1], the pixels of the first pixel group and the pixels of the second pixel group have the same light receiving area.

[5] According to the driving method of [1], an imaging apparatus includes a charge-coupled device type solid-state imaging device, a driving unit that carries out the driving method of [1] The charge-coupled device type solid-sate imaging device includes: a first pixel group, a second pixel group, a plurality of vertical charge transfer paths and an output amplifier. The first pixel group has a plurality of pixels arrayed and formed in a two-dimensional array on a surface portion of a semiconductor substrate. The second pixel group (i) has a plurality of pixels arrayed and formed in a two-dimensional array on the surface portion of the semiconductor substrate in an area that overlaps the first pixel group and (ii) has the plurality of pixels at slipped positions with respect to the respective pixels of the first pixel group. The plurality of vertical charge transfer paths extend along pixel columns and are provided for the respective pixel columns, the pixel columns which (i) have the plurality of pixels of the first pixel group and the plurality of pixels of the second pixel group and (ii) extend in a vertical direction; a horizontal charge transfer path formed along end parts in the transfer direction of the plurality of the vertical charge transfer paths. The output amplifier (i) is provided at the output end portion of the horizontal charge transfer path and (ii) outputs, as imaging image data, voltage value signals responsive to the amount of electric charge of transferred signals.

According to the present invention, because it becomes possible to read progressively detection signals of the first pixel group and the second pixel group whose the exposure times are different from each other, it becomes also possible to read dynamic images at a high frame rate and also to generate dynamic image data of any optional dynamic range width.

DETAILED DESCRIPTION

Hereinafter, a description is given of one embodiment of the present invention with reference to the drawings.

Figure 1:
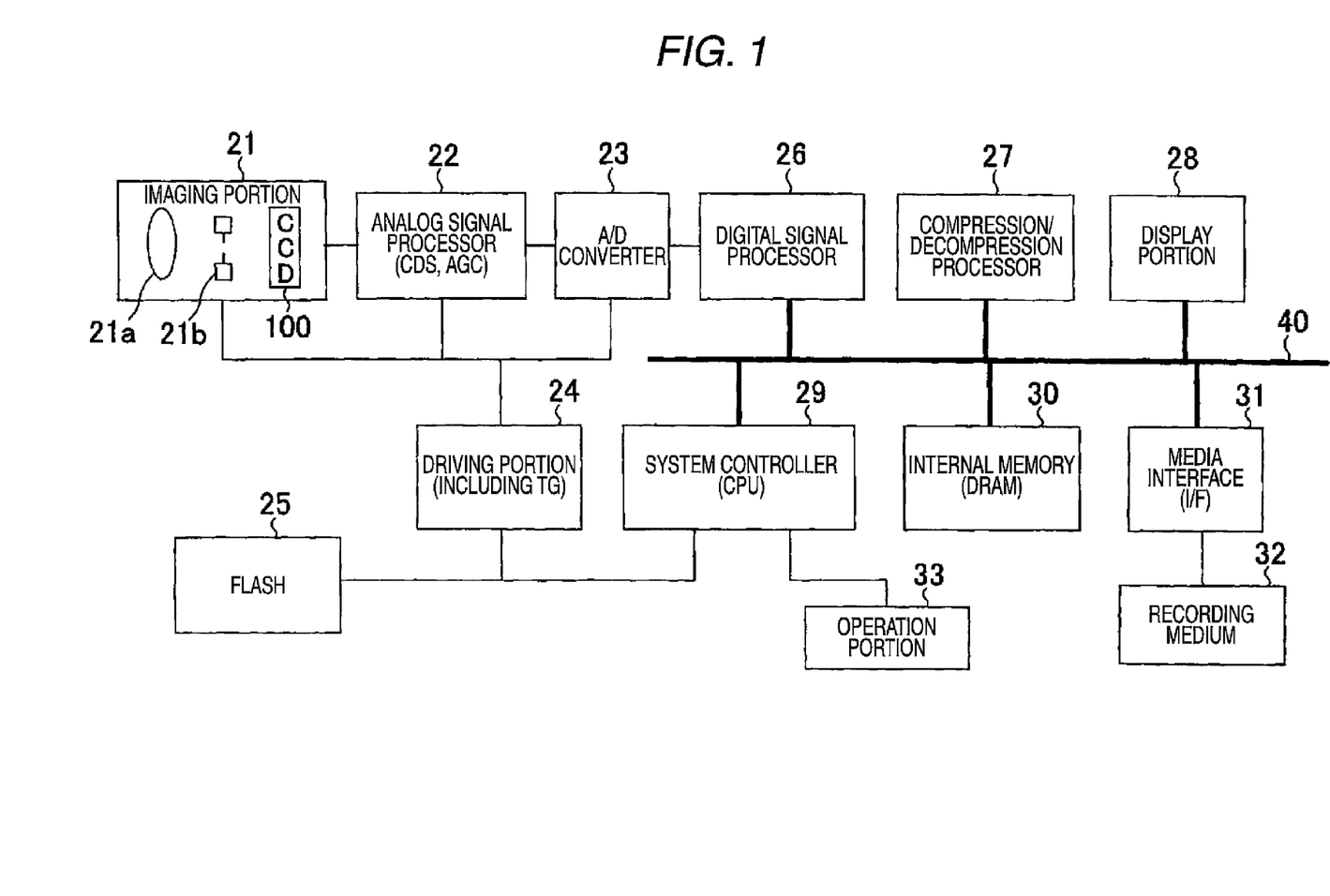
FIG. 1 is a functional block diagram showing a digital camera according to one embodiment of the present invention.

FIG. 1 is a functional block diagram of a digital camera according to one embodiment of the present invention. The digital camera includes a imaging portion 21, an analog signal processor 22 for analog-processing such as automatic gain control (AGC) and correlation double sampling process (CDS), etc., of analog image data output from the imaging portion 21, an analog-digital converter (A/D) 23 for converting analog image data output from the analog signal processor 22 to digital image data, a driving portion (including a timing generator TG) 24 for carrying out drive control of the A/D 23, the analog signal processor 22, and the imaging portion 21 based on instructions from a system controller (CPU) 29 described later, and a flash 25 for emitting flashes based on an instruction of the CPU 29.

The imaging portion 21 includes an optical lens system 21a for condensing light from the field to be picked up, an aperture to stop down light passed through the optical lens system 21a and a mechanical shutter 21b used for taking still images, and a single-plate type solid-state imaging device 100 for imaging of color images, which receives light condensed by the optical lens system 21a and stopped down by the aperture and outputs taken image data (analog image data).

The digital camera according to the present embodiment further includes a digital signal processor 26 that takes in digital image data output from the A/D converter 23 and carries out an interpolation process, a white-balance process, an RGB/YC conversion process, and a synthesizing process of respective detection signals of the first pixel group and the second pixel group described later etc., a compression and decompression processor 27 for compressing image data into the JPEG format, etc., and inversely decompressing the same, a display portion 28 for displaying a menu and displaying a scroll image and a taken image, a system controller (CPU) 29 for totally controlling the entirety of the digital camera, an internal memory 30 such as a frame memory, etc., a media interface (I/F) portion 31 for interface processing with respect to a recording medium in which JPEG image data, etc., are accommodated, and a bus 40 for connecting these portions to each other. In addition, an operation portion 33 for inputting instructions by a user is connected to the system controller 29.

The user operation portion 33 is provided with an instruction switch for setting the imaging mode to a still image imaging mode or a dynamic image imaging mode, a range width instruction button for instructing the dynamic range width, and a shutter release button, etc. The CPU 29 carries out drive control of the solid-state imaging device 100 via the imaging device driving portion 24 in compliance with the input contents from the user operation portion 33.

Figure 2:
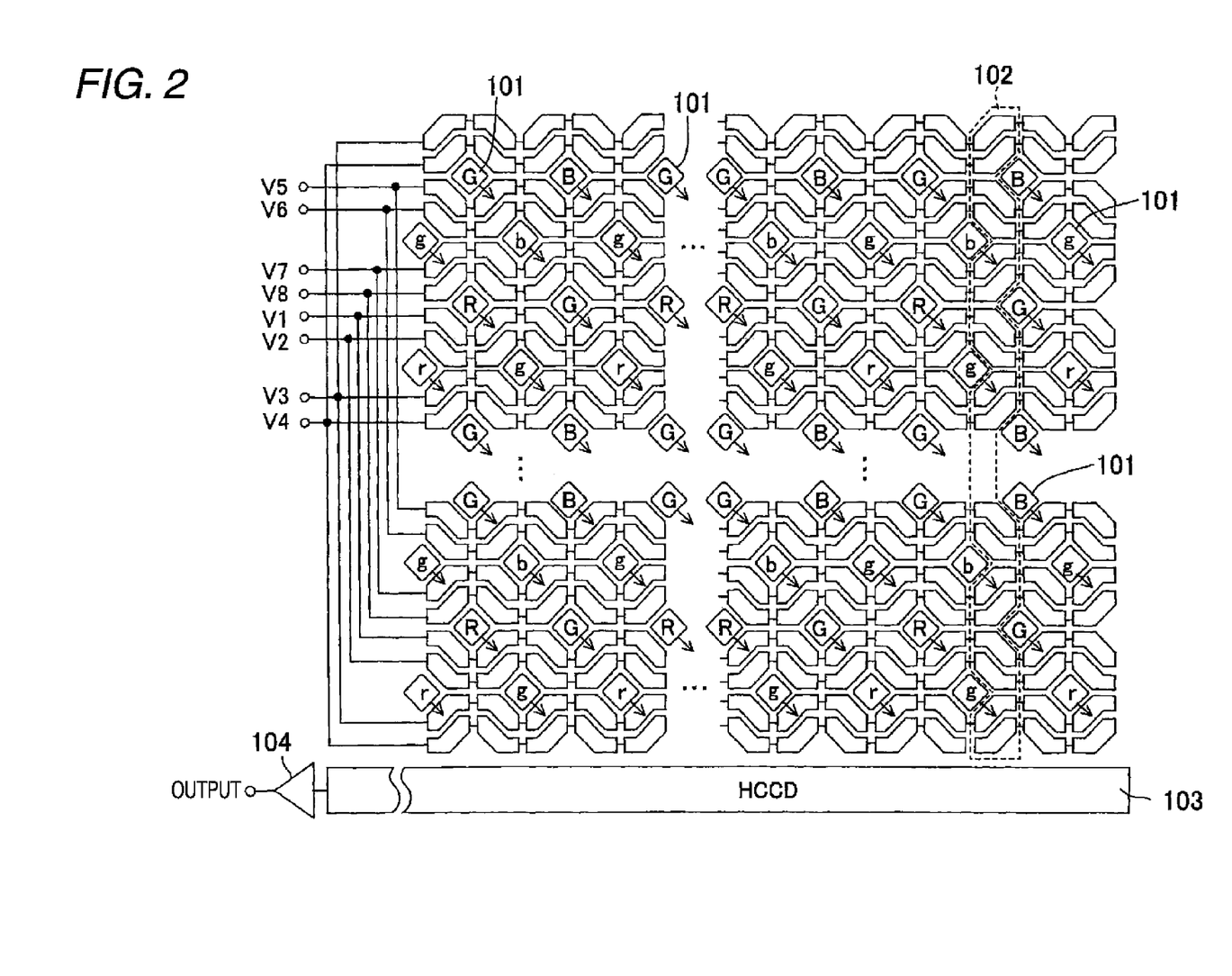
FIG. 2 is a schematic view showing the surface of a CCD type solid-state imaging device shown in FIG. 1.

FIG. 2 is a schematic view showing the surface of the solid-state imaging device 100. In a digital camera according to the present embodiment, a CCD type solid-state imaging device of a so-called honeycomb pixel array in which pixels are arrayed in a checkered pattern is adopted as the solid-state imaging device 100.

A plurality of photoelectric conversion elements (photodiode PD: hereinafter, called a pixel(s)) 101 are arrayed and formed in the form of a two-dimensional array on the surface of a semiconductor substrate. And, pixels of even-numbered pixel lines are formed with one-half pixel pitch slipped with respect to pixels of odd-numbered pixel lines.

If only pixels (the first pixel group) of even-numbered lines (or odd-numbered lines) are observed, the respective pixels (photoelectric conversion elements) are arrayed in the form of a square lattice, color filters (R=red, G=green and B=blue) are arrayed in Bayer arrangement responsive to the square lattice array. Also, if only pixels (the second pixel group) of odd-numbered lines (or even-numbered lines) are observed, the respective pixels are arrayed in the form of a square lattice, color filters (r=red, g=green and b=blue) are arrayed in Bayer arrangement responsive to the square lattice array.

Figure 3:
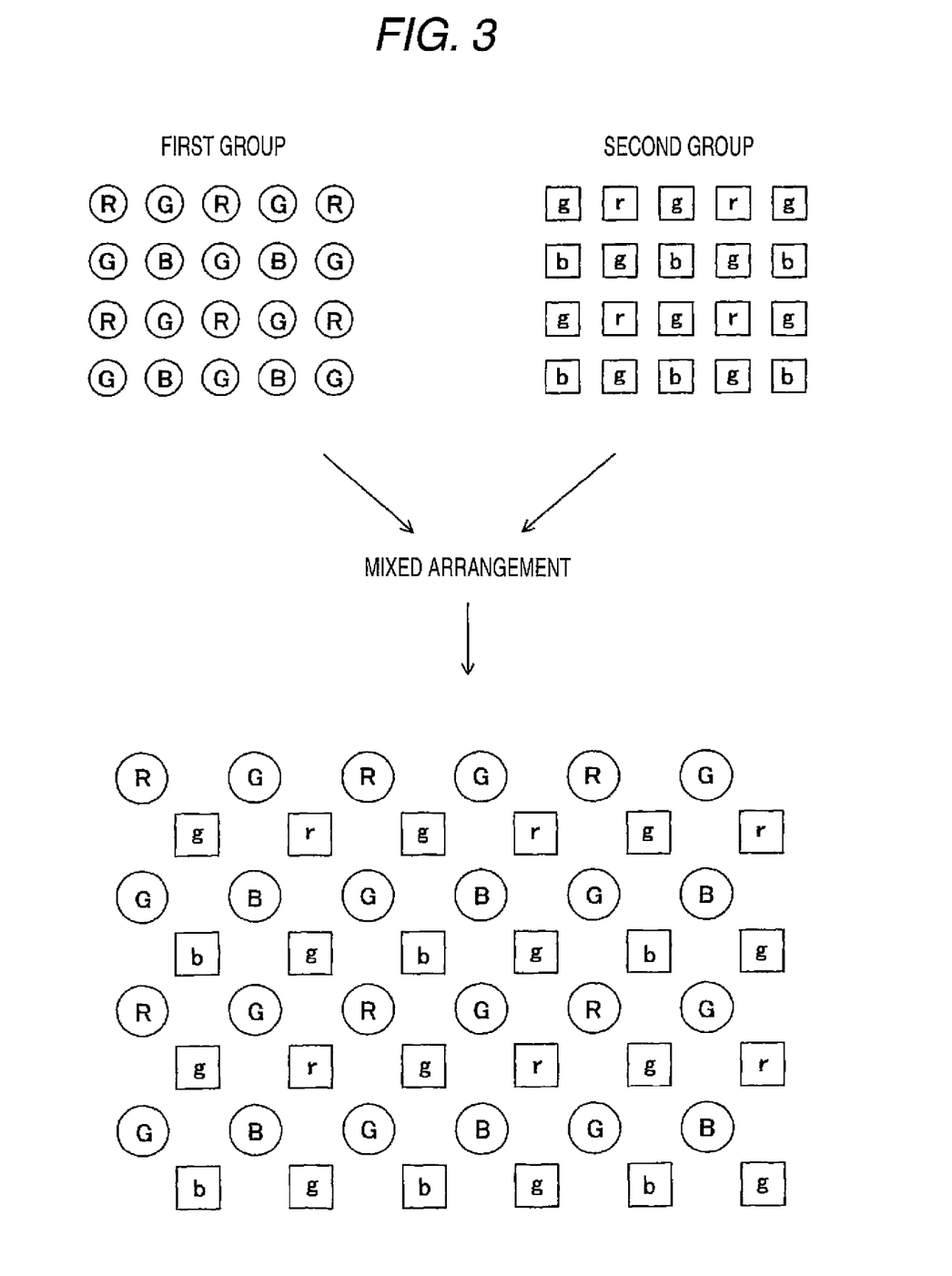
FIG. 3 is a schematic view showing a color filter array of the CCD type solid-state imaging device shown in FIG. 2.

FIG. 3 is a schematic view of color filters of a CCD type solid-state imaging device shown in FIG. 2. R, G and B color filters are arrayed in Bayer arrangement in the first pixel group arrayed in a square lattice, and r, g and b color filters are also Bayer arrangement in the second pixel group arrayed in a square lattice.

If pixels of the second pixel group is arrayed with one-half pixel pitch slipped in the both line and row directions with respect to pixels of the first pixel group, the color filter array shown in the lower stage of FIG. 3 is brought about, and a double structure of Bayer arrangement is brought about as the entirety.

Hereinafter, a description is based on the assumption that a red signal, a green signal, a blue signal, which are respective detection signals of the first pixel group, and filter colors are expressed by capital letters R, G and B, pixels having filters R, G and B incorporated are R pixel, S pixel and B pixel, and on the assumption that a red signal, a green signal, a blue signal, which are respective detection signals of the second pixel group, and filter colors are expressed by small letters r, g and b, pixels having filters r, g and b incorporated are r pixel, g pixel and b pixel.

In the CCD type solid-state imaging device according to the present embodiment, the areas of R pixel, r pixel, G pixel, g pixel, B pixel and b pixel are the same, and the charge accumulation time of R, G, B pixels and r, g, b pixels are varied as described later in detail, thereby achieving a wide dynamic range of dynamic image data.

Returning to FIG. 2, vertical charge transfer paths (VCCD) 102 are formed to meander with avoiding respective pixels 101 along respective pixel rows, and a horizontal charge transfer path (HCCD) 103 is provided along the end parts in the transfer directions of the respective vertical charge transfer paths 102, and an amplifier 104 for outputting, as imaging data, a voltage value signal responsive to the amount of transferred charge is provided at the output portion of the horizontal charge transfer path 103.

V1 through V5 described at the left side of FIG. 2 show pulse application pads of transfer electrodes V1 through V5 that compose the vertical charge transfer paths 102. For example, if a reading pulse is applied to the transfer electrodes V1 and V5, accumulated charges of the first group pixels R, C and B are read in potential packets under the transfer electrodes (concurrently used as reading electrodes) V1 and V5, and if a reading pulse is applied to the electrodes V3 and V7, the accumulated charges of the second group pixels r, g and b are read in potential packets under the transfer electrodes (concurrently used as reading electrodes) V3 and V7.

Also, a description was given using the terms "horizontal" and "vertical". This only means "one direction" along the surface of a semiconductor substrate and "a direction orthogonal to the direction."

Figure 4:
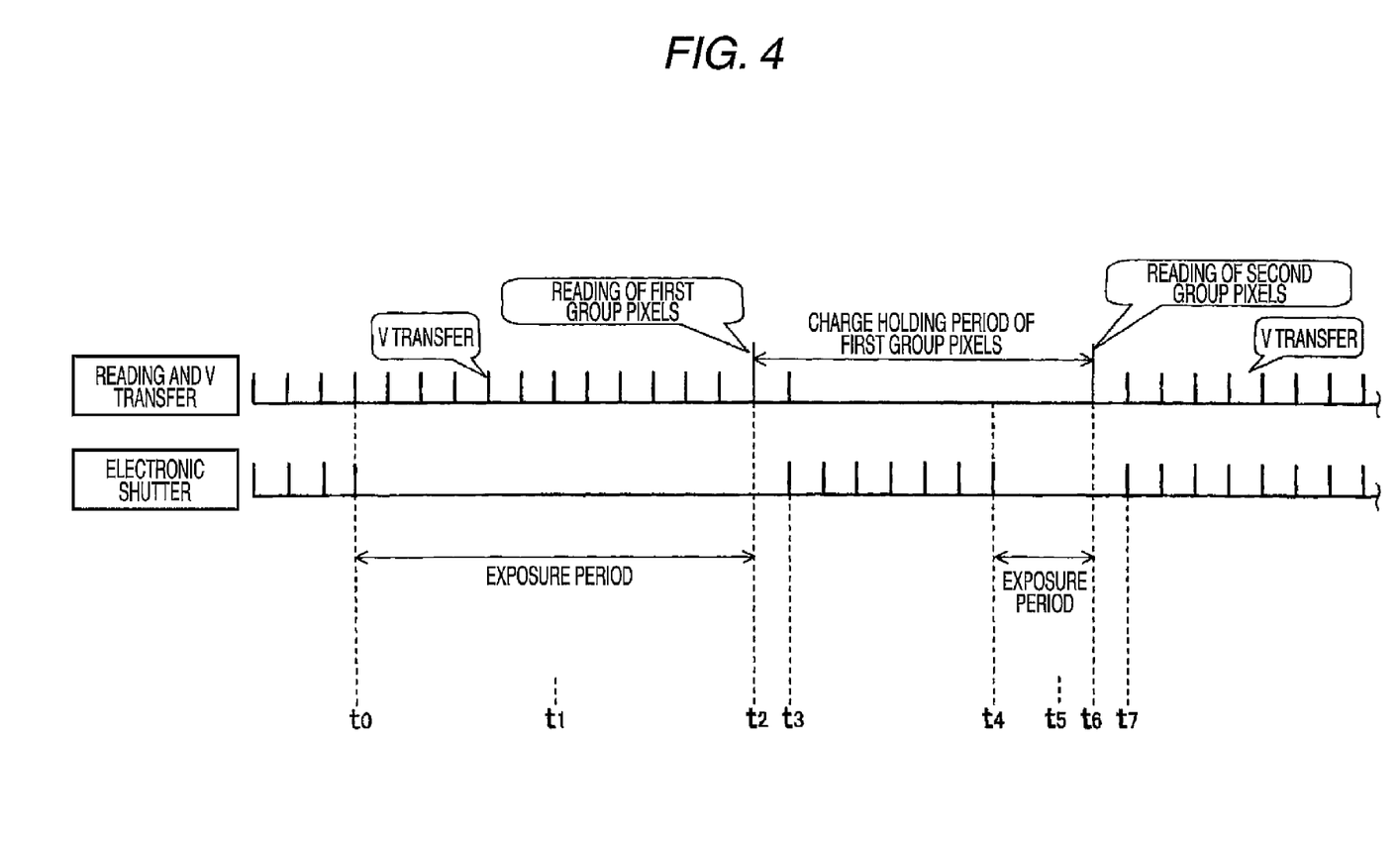
FIG. 4 is a sequence diagram showing a method for driving the CCD type solid-state imaging device according to the embodiment of the present invention.

FIG. 4 is a sequence diagram showing a driving method of a CCD type solid-state imaging device, along which the CPU 29 carries out via the driving portion 24 when a user inputs an instruction of dynamic imaging in the digital camera described in FIG. 1, and FIG. 4 shows the timing of reading and V (vertical) transfer, and the timing of electronic shutter.

Figure 5A:
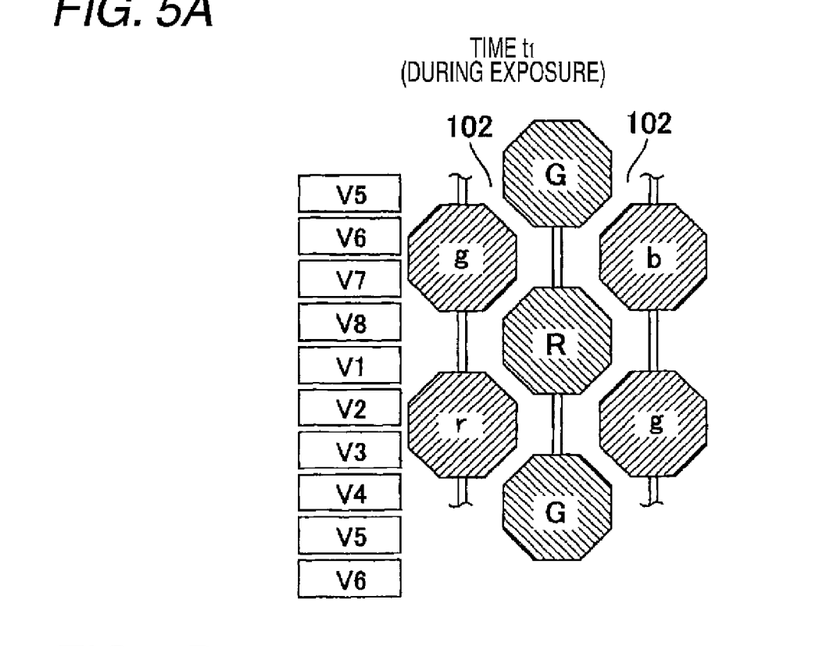
FIG. 5A is a schematic view showing a status at time t1 shown in FIG. 4

First, a pulse voltage of electronic shutter is applied to the substrate at time t0, the remaining charge in the pixels (photodiodes) 101 is dropped to the semiconductor substrate side, and exposure is commenced from the OFF timing of the pulse voltage of electronic shutter. At time t1 during the exposure, charges responsive to the amount of exposure are accumulated (shown by hatching in FIGS. 5A and 5B) in respective pixels 101 of the first group pixels R, G and B and the second group pixels r, g and b as shown in FIG. 5A.

Figure 5B:
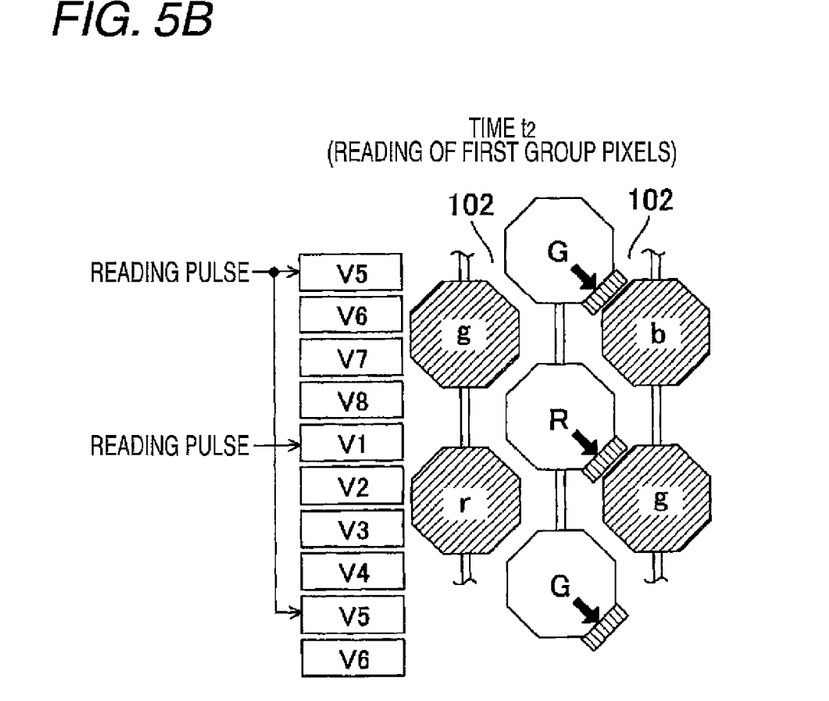
FIG. 5B is a schematic view showing a status at time t2 shown in FIG. 4.

When the exposure period is over at time t2, and a reading pulse is applied to the transfer electrodes V1 and V5, the accumulated charges of R pixel, G pixel and B pixel of the first pixel group are read in the potential packet formed under the electrodes V1 and V5 (FIG. 5B).

Figure 6A:
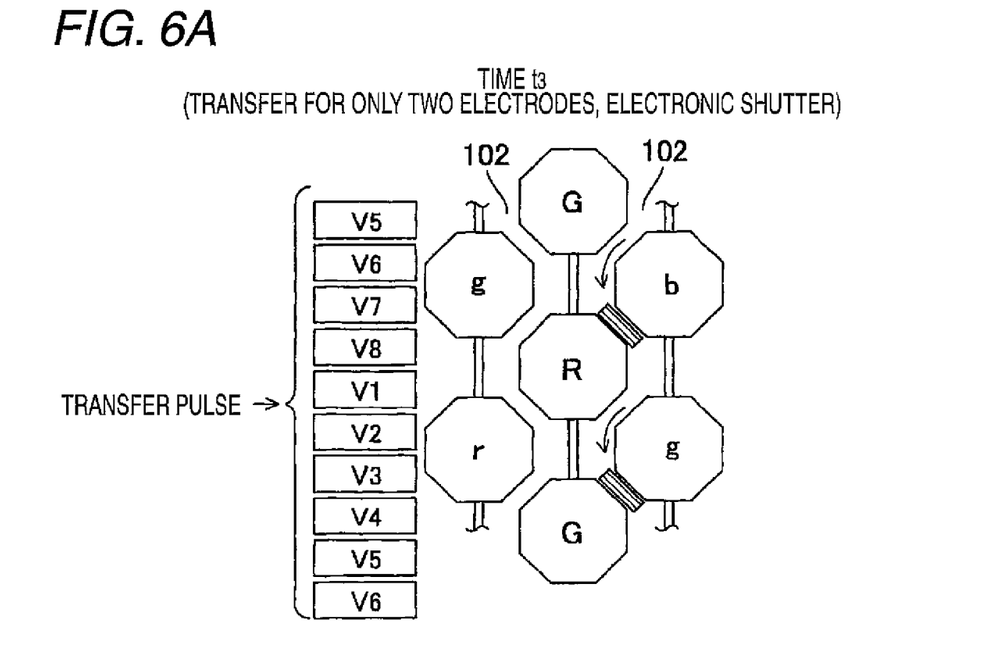
FIG. 6A is a schematic view showing a status at time t3 shown in FIG. 4.

After that, vertical transfer for two vertical transfer electrodes is carried out to time t3 as shown in FIG. 6A. Thereafter, the vertical transfer drive is stopped, and an electronic shutter pulse is applied to the substrate.

A pixel (photodiode) 101 in which a signal charge (in many cases, electrons) and a buried channel of the vertical charge transfer paths are constituted at n-type areas formed on a p-type well layer surface portion of the n-type semiconductor surface. The n-type area of the photodiode 101 is formed deep to the position closer to the n-type semiconductor substrate than the n-type area of the buried channel, or the thickness of the p-type well layer of the n-type area formed point of the photodiode 101 is formed thinner than the p-type well layer of the point the buried channel is formed.

Therefore, even if the voltage to drop the accumulated charges of the photodiode 101 to the semiconductor substrate side is applied as an electronic shutter voltage, charges read by the vertical charge transfer path 102 remain in the buried channel of the vertical charge transfer path 102 as they are. That is, the vertical charge transfer path functions as a memory of signal charge read from the respective pixels.

Therefore, although the accumulated charges of r pixel, g pixel and b pixel of the second group are dropped to the semiconductor substrate side by application of an electronic shutter pulse at time t3, detected charges of R pixel, G pixel and B pixel of the first group, which are read by the vertical charge transfer path 102 at time t2 will remain in the vertical charge transfer path 102.

Figure 6B:
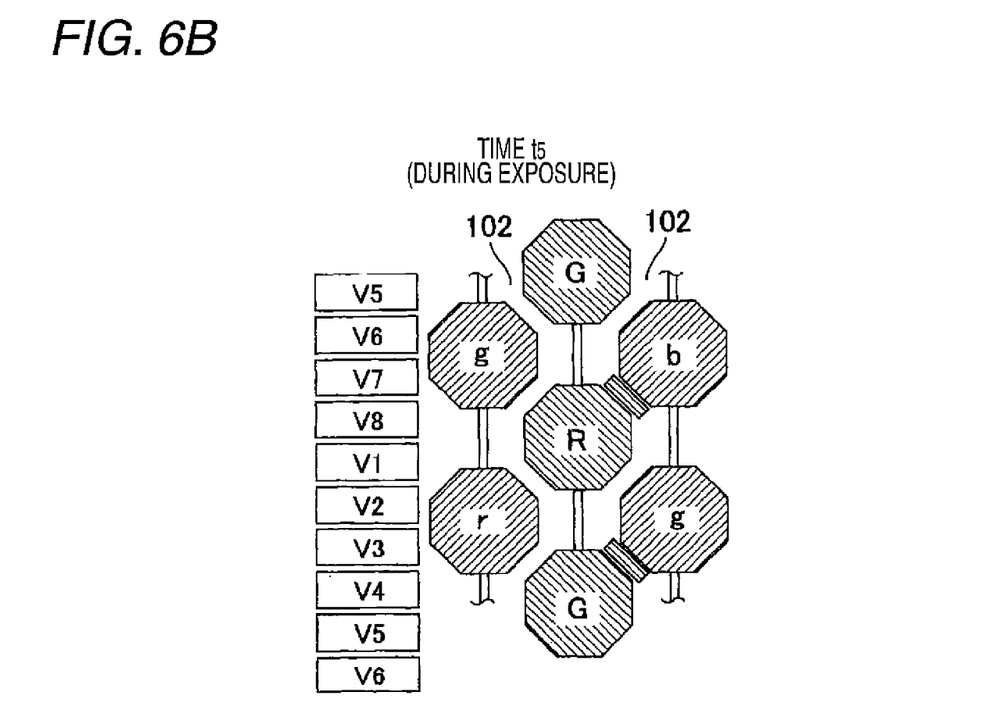
FIG. 6B is a schematic view showing a status at time t5 shown in FIG. 4.

An electronic shutter pulse is applied to the substrate at the next time t4 (although another time is provided between time t3 and time t4 in FIG. 4, the same time may be acceptable), and exposure is commenced again from the OFF timing of the pulse. At time t5 during the exposure, charges responsive to the amount of charge are accumulated in the respective pixels R, G, B, r, g and b of the first and the second groups as shown in FIG. 6B.

Figure 7A:
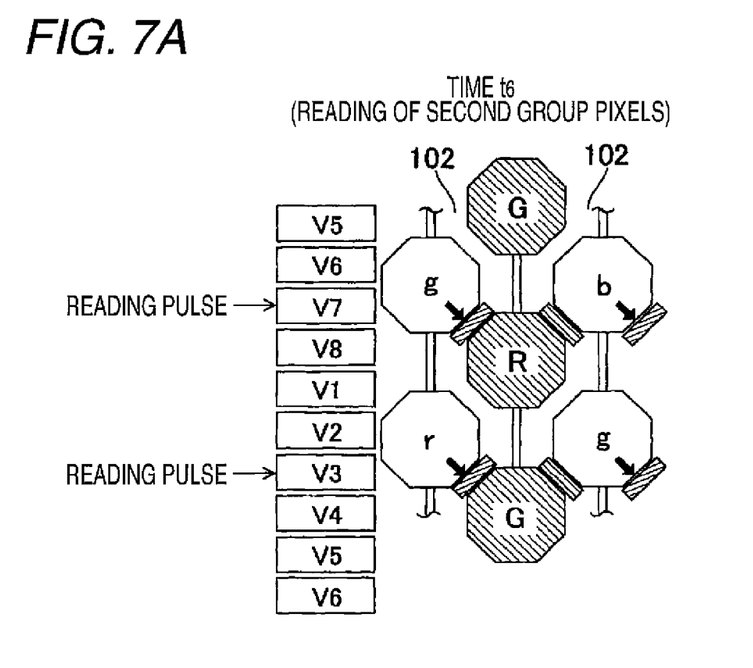
FIG. 7A is a schematic view showing a status at time t6 shown in FIG. 4.
Figure 7B:
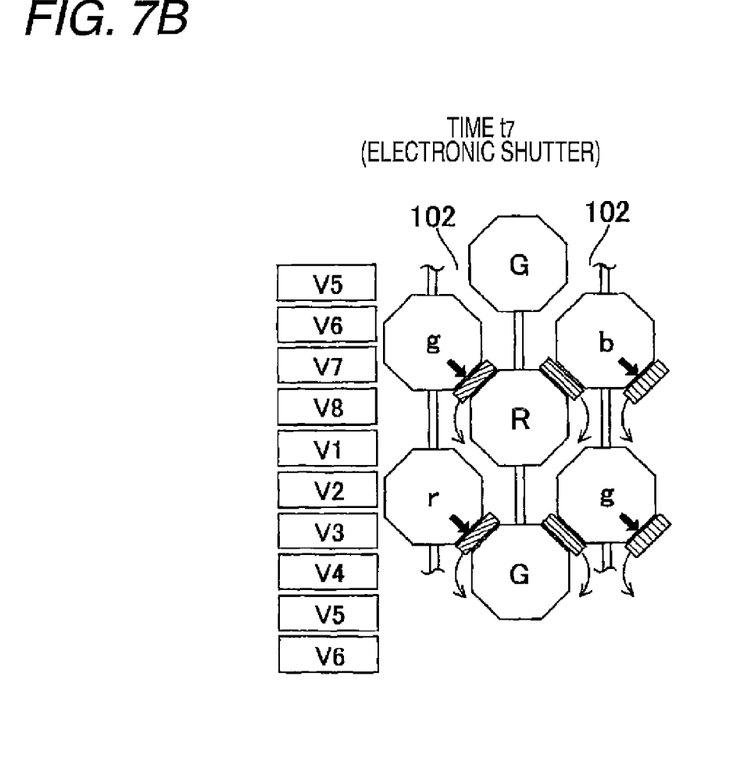
FIG. 7B is a schematic view showing a status at time t7 shown in FIG. 4.

As a reading pulse to determine the termination of exposure is applied to the transfer electrode and concurrently-used reading electrode V3 and V7 at the next time t6, the accumulated charges of r pixel, g pixel and b pixel of the second group are read in the potential packet under the electrodes V3 and V7, respectively, as shown in FIG. 7A.

Since charges read from pixels R, G and B of the first group are already sufficiently transferred for two electrodes and are transferred to the position adjacent to r, g and b pixels, respective detected charges of the pixels of the first and second groups for two lines, which are shown in FIG. 2, are horizontally arranged in one line when the accumulated charges are read from r, g and b pixels of the second group.

As an electronic shutter pulse is applied to the substrate at the next time t7, the remaining charges of the respective pixels 101 are dropped to the substrate side, the charges detected by the pixels R, G and B of the first group during the exposure period (times t2 through t0) and charges detected by the pixels r, g and b of the second group during the exposure period (times t6 through t4) remain in the respective vertical charge transfer paths 102, and these charges are transferred in the vertical direction altogether and will be outputted from the CCD type solid-state imaging device 100.

That is, respective detection signals of pixels R, G and B of the first group and pixels r, g and b of the second group will be progressively read.

The digital signal processor 26 of FIG. 1 generates dynamic image data in a wide dynamic range by synthesizing the detection signals of pixels R, G and B of the first group and the detection signals of pixels r, g and b of the second group, displays the same on the display portion 28, and simultaneously stores the same in a recording medium 32.

The range magnification of the dynamic range of the dynamic image data can be optionally set by adjusting the ratio of the respective exposure periods ([t2-t0], [t6-t4]) described above, and the CPU 29 determines the respective exposure periods of a range magnification instructed by a user or the default range magnification.

Figure 8:
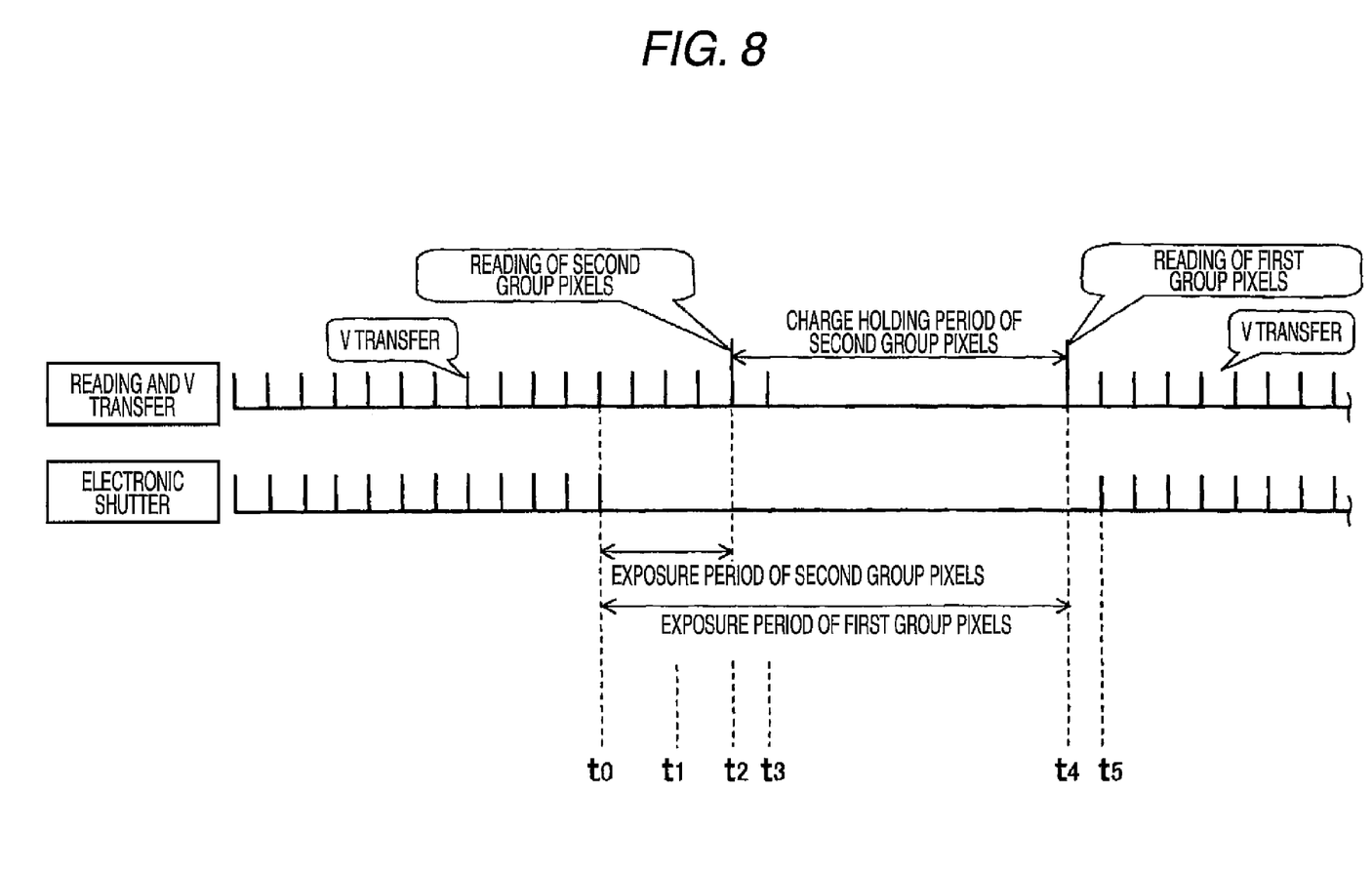
FIG. 8 is a sequence diagram showing a method for driving the CCD type solid-state imaging device according to another embodiment of the present invention.
Figure 9A:
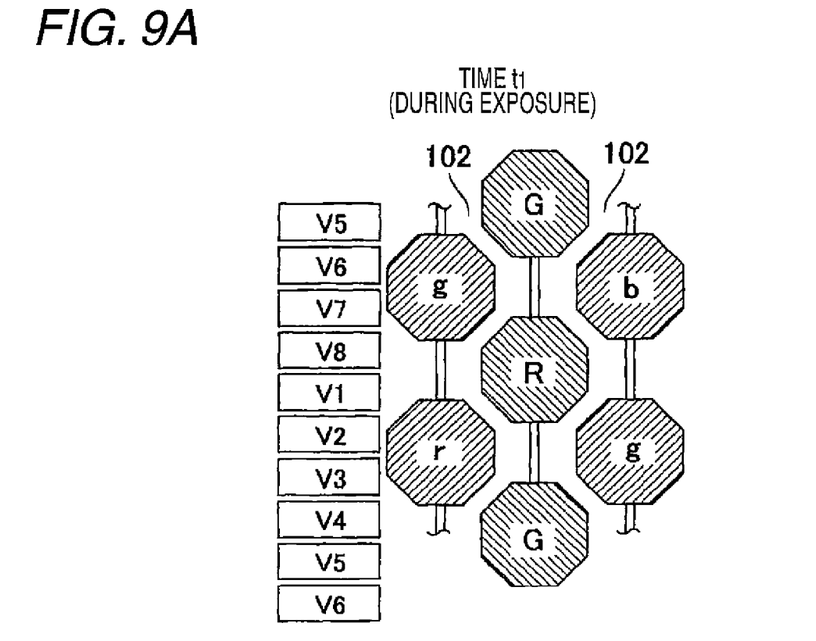
FIG. 9A is a schematic view showing a status at time t1 shown in FIG. 8.

FIG. 8 is a sequence diagram showing a method for driving a CCD type solid-state imaging device according to another embodiment of the present invention. In the present embodiment, an electronic shutter pulse is applied to a substrate at time t0, and exposure is commenced from the OFF timing of the pulse. Therefore, a signal charge responsive to the amount of exposure is accumulated in pixels R, G and B of the first group and in pixels r, g and b of the second group, respectively, at time t1 during the exposure (FIG. 9A).

Figure 9B:
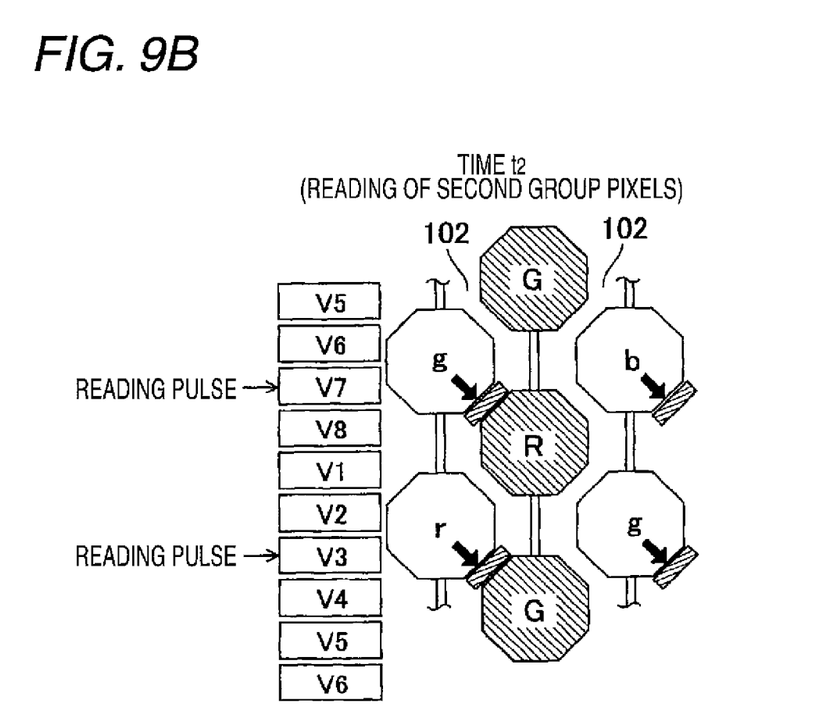
FIG. 9B is a schematic view showing a status at time t2 shown in FIG. 8.

As a reading pulse is applied to electrodes V3 and V7 at time t2, the accumulated charges of r pixel, g pixel and b pixel of the second group are read in potential packets under the electrodes V3 and V7 (FIG. 9B).

Figure 10A:
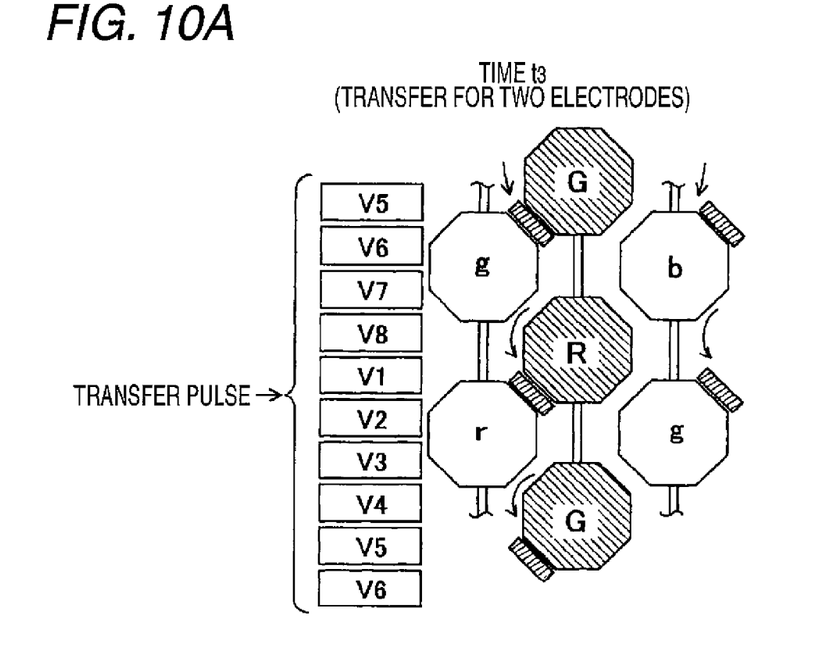
FIG. 10A is a schematic view showing a status at time t3 shown in FIG. 8.

After that, as shown in FIG. 10A, vertical transfer is carried out for two vertical transfer electrodes until time t3. Thereafter, the vertical transfer drive is stopped. Since exposure is continued, signal charges are continuously accumulated in pixels R, G and B of the first group from time t0, and charge is newly accumulated in pixels r, g and b of the second group after time t2.

Figure 10B:
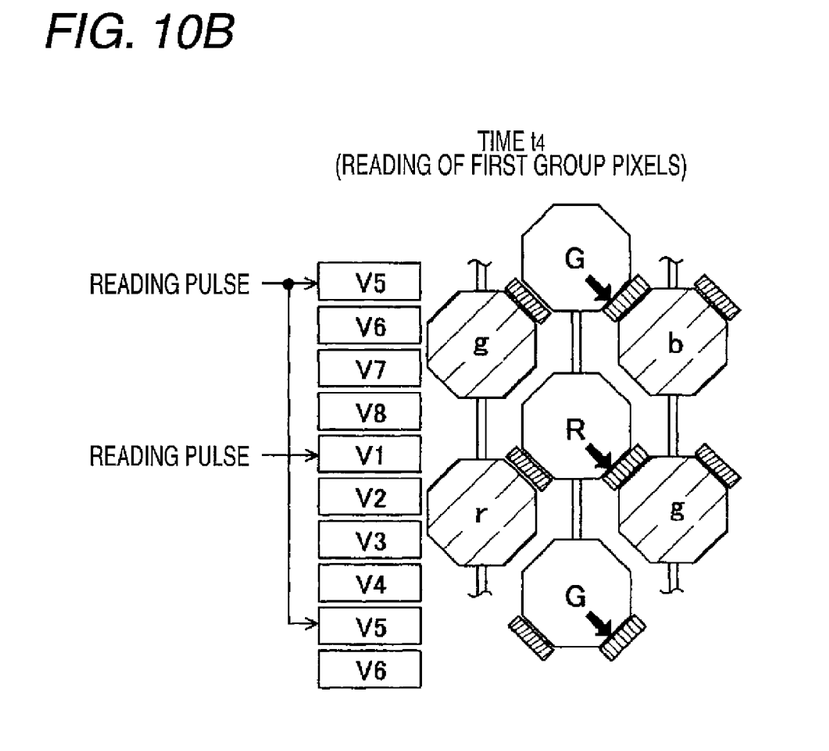
FIG. 10B is a schematic view showing a status at time t4 shown in FIG. 8.

If a reading pulse is applied to the electrodes V1 and V5 at the next time t4, the accumulated charges of pixels R, G and B of the first group are read in the potential packets under the electrodes V1 and V5. After that, if an electronic shutter pulse is applied at time t5, the remaining charges in the respective pixels R, G, B, r, g and b are dropped to the substrate side, and since a transfer pulse is applied to the vertical charge transfer paths, the respective signal charges R, G, B, r, g and b on the vertical charge transfer paths are transferred, and output from the CCD type solid-state imaging device.

The digital signal processor 26 of FIG. 1 generates dynamic image data in a wide dynamic range by synthesizing the detection signals of pixels R, G and B of the first group and the detection signals of pixels r, g and b of the second group, displays the same on the display portion 28, and simultaneously stores the same in a recording medium 32.

The range magnification of the dynamic range of the dynamic image data can be optionally set by adjusting the ratio of the respective exposure periods ([t2-t0], [t4-t0]) described above, and the CPU 29 determines the respective exposure periods of a range magnification instructed by a user or the default range magnification.

In the respective embodiments described above, the digital signal processor 26 synthesizes the detection signals of pixels R, G and B of the first group and those of pixels r, g and b of the second group. However, since the color filter array shown at the lower stage of FIG. 2 and FIG. 3 are of a double structure of Bayer alignment in the respective embodiments described above, the first group pixel and the second group pixel immediately close to each other become the same color pixels, whereby signal synthesizing is made easy and appropriate, and it becomes possible to obtain a high quality synthesized image in a wide dynamic range.

Also, in the above-described embodiments, color filter array of a double structure in which Bayer arrangement is carried out is combined with a honeycomb pixel array in which pixels are arrayed in a checkered pattern as the entirety. However, the entire pixel array and color filter array are not limited thereto. For example, the driving method according to the above-described embodiments may be applicable to a CCD type solid-state imaging device in which the entire pixels are arrayed in a square lattice pattern.

Figure 11:
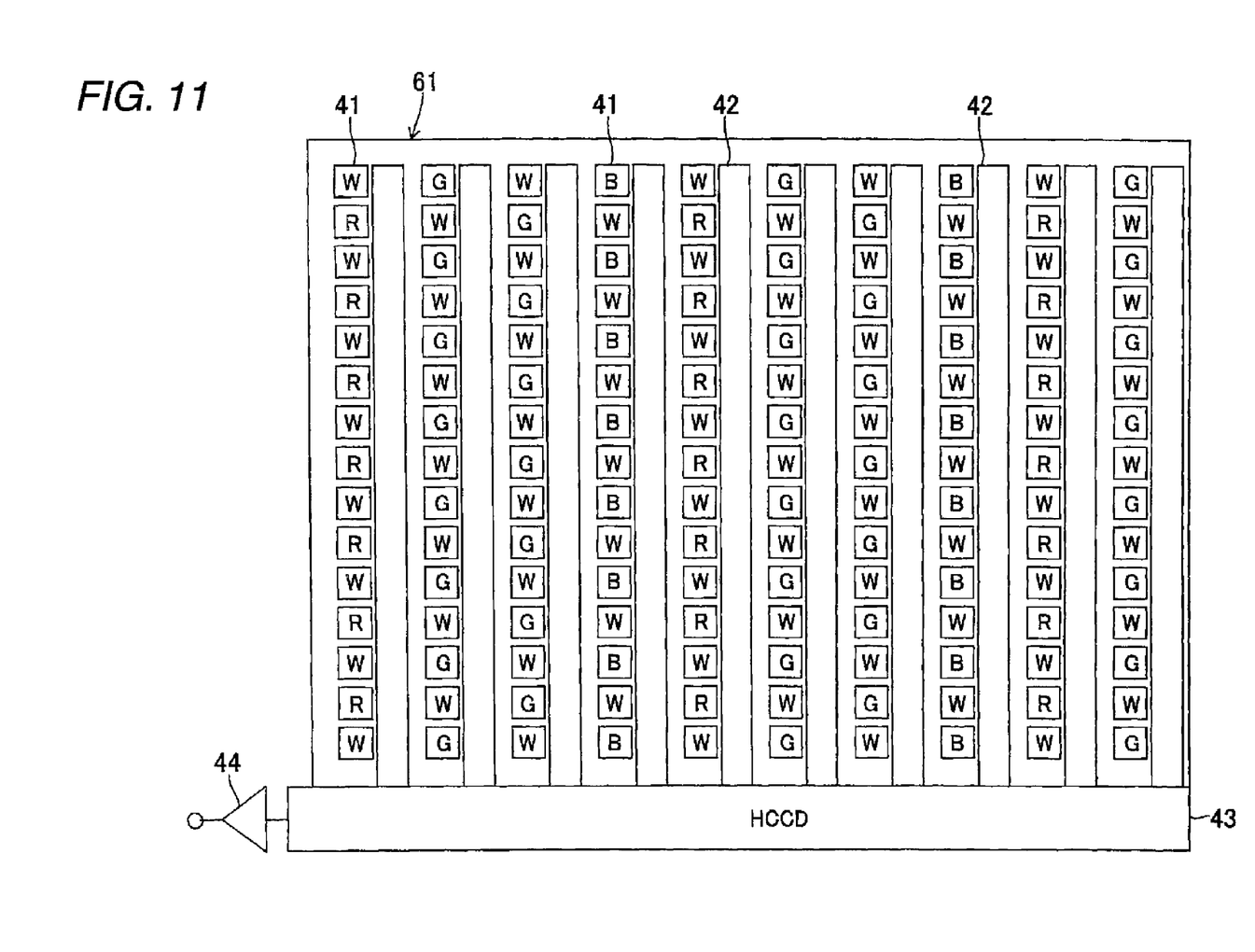
FIG. 11 is a schematic view of the surface, which shows one example of a CCD type solid-state imaging device instead of a solid-state imaging device shown in FIG. 2.

In the CCD type solid-state imaging device 61 shown in FIG. 11, respective pixels 41 are arrayed in a square lattice pattern, and color filters of R(Red), G(Green) and B(Blue) are laminated on the checkered positions, and W filters (transparent filters, pixels having the W filter become brightness detection pixels) are laminated on the remaining checkered positions.

In the CCD type solid-state imaging devices arrayed in a square lattice pattern, a progressively readable structure (for example, three or more electrodes are provided per pixel) is required for the array structure of transfer electrodes of the vertical charge transfer path 41. However, in this case, by making two pixel reading electrodes adjacent to each other in the horizontal direction different from each other, the driving method according to the above-described embodiments may be applicable thereto if, for example, a pixel group in which W pixels are laminated is made into the first pixel group and a pixel group in which color filters R, G and B are laminated is made into the second pixel group.

Figure 12:
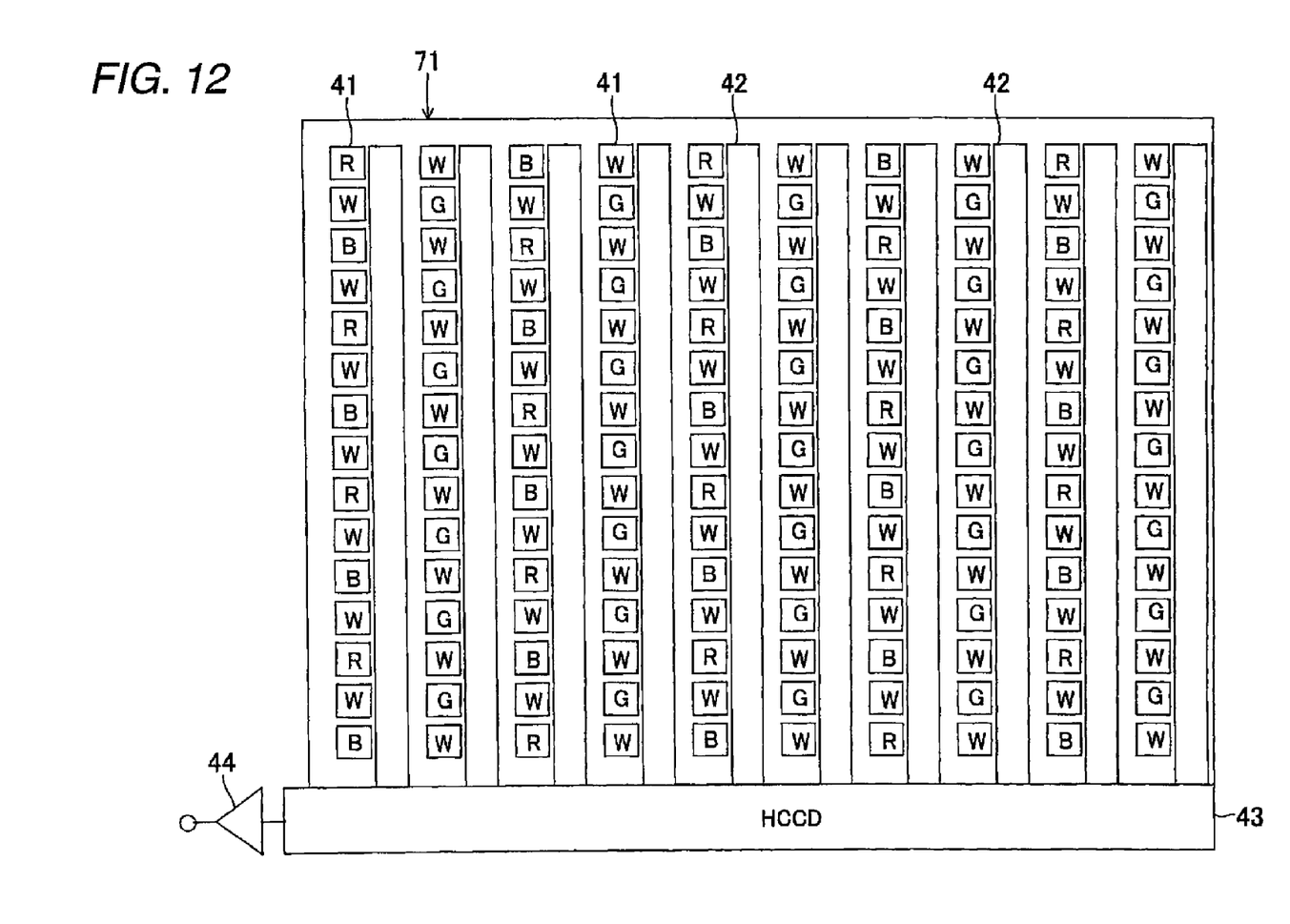
FIG. 12 is a schematic view of the surface, which shows another embodiment of a CCD type solid-state imaging device instead of the solid-state imaging device shown in FIG. 11.

FIG. 12 is a schematic view showing the surface according to still another embodiment in which the color filter array of the CCD type solid-state imaging device shown in FIG. 11 is changed. The CCD type solid-state imaging device 71 is the same as the CCD type solid-state imaging device 61 shown in FIG. 11 in the point that W filters are provided at the checkered position pixels of the first group, but it differs in that the array of remaining R, G and B color filters provided at the checkered position pixels of the second group is changed.

That is, the present embodiment is composed so that, where G(Green) color filters are provided in odd-numbered lines (or even-numbered lines) of the second group pixels and only the pixels of even-numbered lines (or odd-numbered lines) are observed, the R pixels are arrayed in checkered patterns, and the B pixels are arrayed in the remaining checkered patterns.

If such a color filter array is adopted, a color array of taken image signals read from the second group pixels becomes the same as the color filter array (For example, JP Hei. 10-136391 A corresponding to U.S. Pat. No. 6,236,434 B) of a so-called honeycomb pixel array, whereby a signal processing method and a signal processing circuit, which are developed and used for such color filter array, may be utilized as they are.

Figure 13:
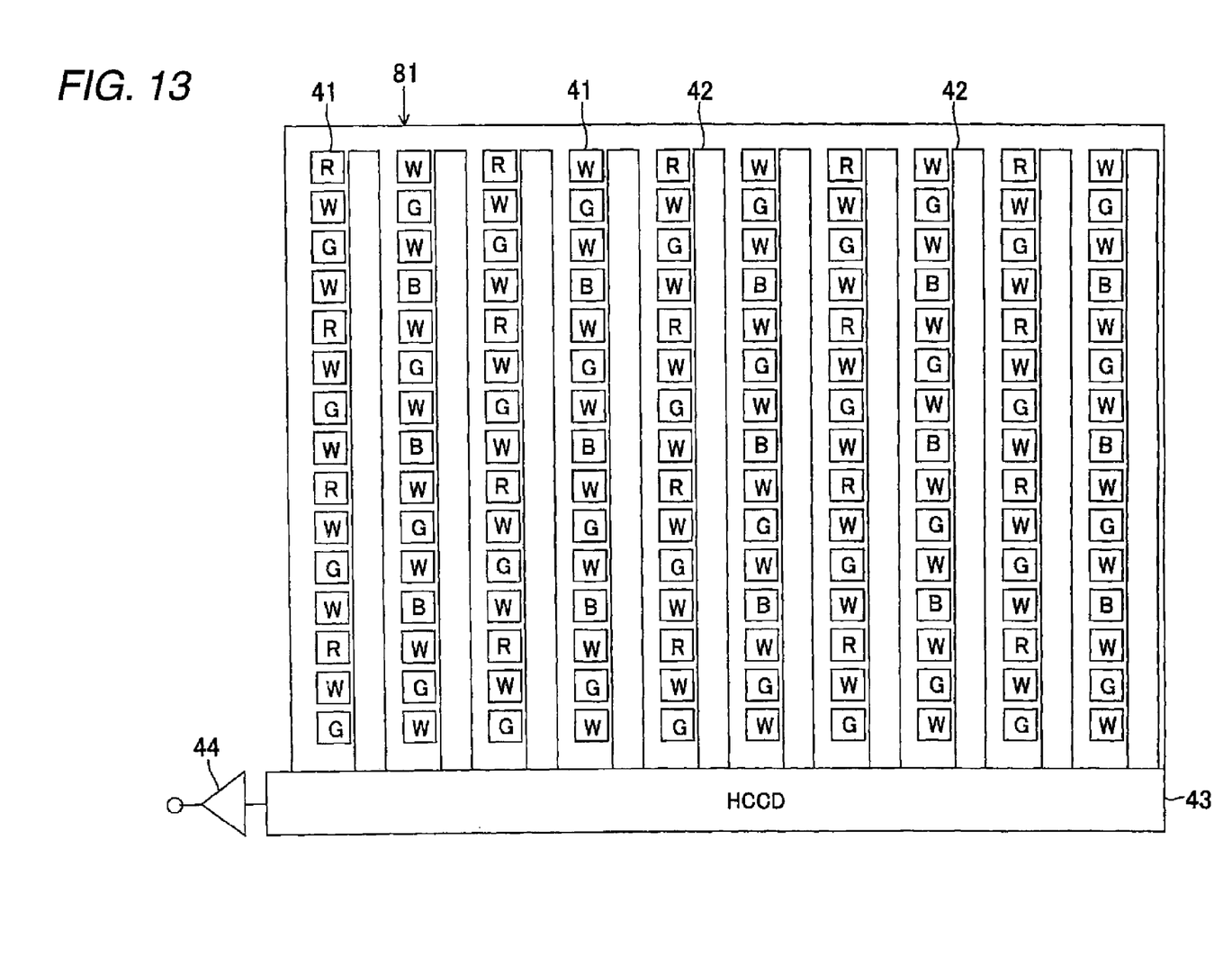
FIG. 13 is a schematic view of the surface, which shows another embodiment of a CCD type solid-state imaging device instead of the solid-state imaging device shown in FIG. 12.

FIG. 13 is a schematic view showing the surface of a CCD type solid-state imaging device having a color filter array according to a further another embodiment. In the CCD type solid-state imaging device 81 according to the embodiment, the color filter array of the second group pixels being the checkered position pixels are devised to become the same as the Bayer arrangement.

That is, in FIG. 13, color arrays of image signals read from the second group pixels are squeezed up in the vertical direction and observed, a line in which the color arrays become RGRG . . . in the horizontal direction and a line in which the color arrays become GBGB . . . are disposed alternately, where they become the same as the Bayer alignment. Therefore, with respect to the image signals read from the second group pixels, a signal processing method and a signal processing circuit, which are developed and used for the Bayer arrangement, may be utilized as they are.

In addition, in the description of respective embodiments described above, it is optional that either one of two pixel groups is determined to be the first pixel group.

Since a method for driving a CCD type solid-state imaging device according to the present invention is capable of reading imaging data, by which dynamic image data in a wide dynamic range can be generated, which can be read from imaging devices at a high frame rate, the method may be usefully applicable to a digital camera, etc., having a dynamic imaging feature.

What is claimed is:

1. A driving method for driving a charge-coupled device type solid-state imaging device including: a first pixel group that has a plurality of pixels arrayed and formed in a two-dimensional array on a surface portion of a semiconductor substrate; a second pixel group that (i) has a plurality of pixels arrayed and formed in a two-dimensional array on the surface portion of the semiconductor substrate in an area that overlaps the first pixel group and (ii) has the plurality of pixels at slipped positions with respect to the respective pixels of the first pixel group; a plurality of vertical charge transfer paths that extend along pixel columns and are provided for the respective pixel columns, the pixel columns which (i) have the plurality of pixels of the first pixel group and the plurality of pixels of the second pixel group and (ii) extend in a vertical direction; a horizontal charge transfer path formed along end parts in the transfer direction of the plurality of the vertical charge transfer paths; and an output amplifier that (i) is provided at the output end portion of the horizontal charge transfer path and (ii) outputs, as taken image data, voltage value signals responsive to the amount of electric charge of transferred signals, the driving method comprising:

controlling, when taking dynamic images without a mechanical shutter, exposure time of the first pixel group and exposure time of the second pixel group separately by an electronic shutter function and by timings of reading pulses applied to transfer electrodes which concurrently functions as reading electrodes and which are included in the vertical charge transfer paths;

causing the vertical charge transfer paths to hold, until the reading pulses are applied to the second pixel group, signal charges read from the respective pixels of the first pixel group to which the reading pulses are applied beforehand of the first pixel group and the second pixel group;

transferring the signal charges read from the first pixel group and signal charges read from the second pixel group together on the vertical charge transfer paths; and outputting the signal charges read from the first pixel group and the signal charges read from the second pixel group together from the output amplifier.

2. The driving method according to claim 1, wherein
the pixels of the first pixel group are arranged in a square lattice,
the pixels of the second pixel group are arranged in a square lattice,
the pixels of the second pixel group are disposed with one-half pixel pitch slipped in both the horizontal and the vertical directions with respect to the pixels of the first pixel group,
the vertical charge transfer paths are formed to meander with avoiding the pixels in the vertical direction,
color filters laminated on respective pixels of the first pixel group are in Bayer arrangement, and
color filters laminated on respective pixels of the second pixel group are in Bayer arrangement.

3. The driving method according to claim 2, further comprising:

transferring the signal charges read from the respective pixels of the first pixel group in the vertical direction to positions adjacent to the horizontal direction of the pixels of the second pixel group; and causing the vertical charge transfer paths to hold the signal charges transferred at the positions until the signal charges are read from the second pixel group.

4. The driving method according to claim 1,
wherein the pixels of the first pixel group and the pixels of the second pixel group have the same light receiving area.

* * * * *